March 8, 1949. H. J. HERZOG 2,463,621
DETACHABLE HANDLE CONNECTION
Filed Dec. 6, 1946
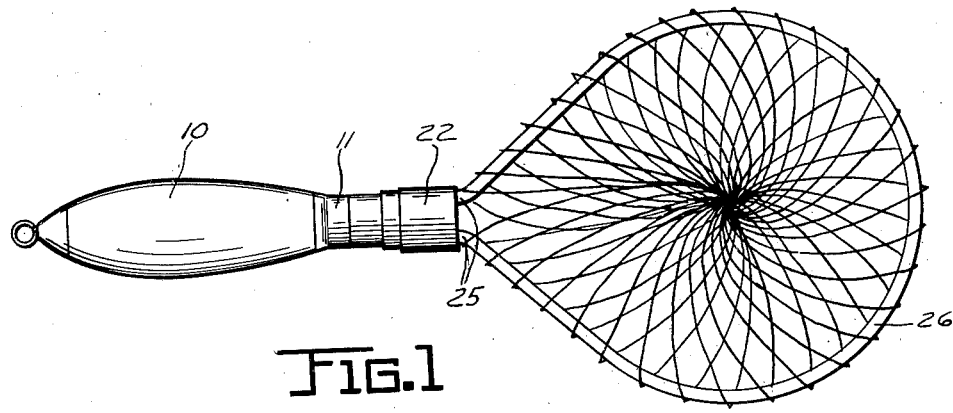
FIG.1
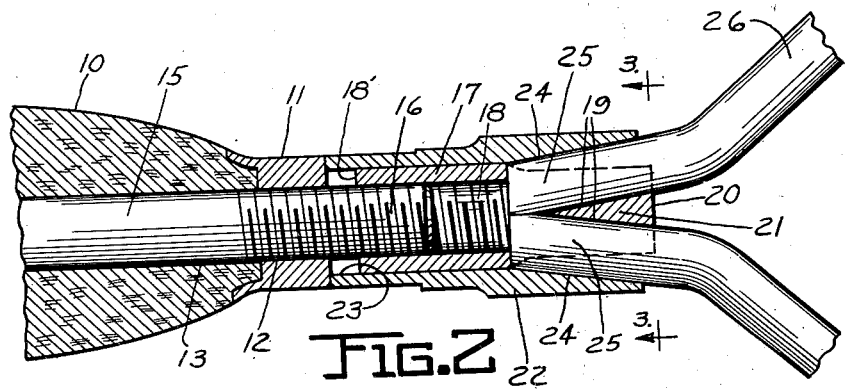
FIG.2
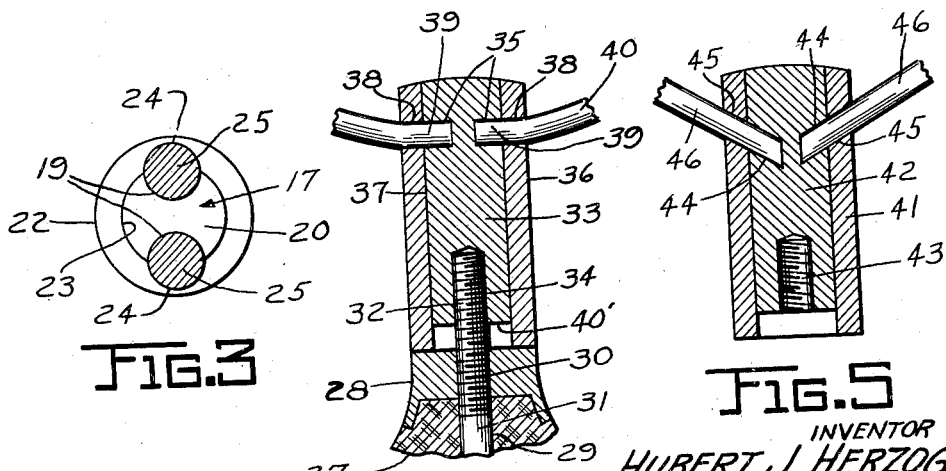
FIG.3
FIG.4
FIG.5
INVENTOR
HUBERT J. HERZOG
BY
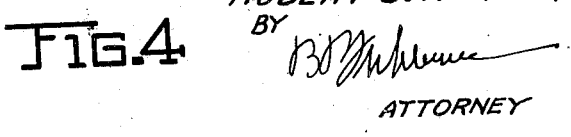
ATTORNEY Patented Mar. 8, 1949

2,463,621

UNITED STATES PATENT OFFICE 2,463,621

DETACHABLE HANDLE CONNECTION

Hubert J. Herzog, Mishawaka, Ind.

Application December 6, 1946, Serial No. 714,454

1 Claim. (Cl. 306—45)

My invention relates to a detachable handle connection for the frames of fish landing nets, floor mops, and the like.

An important object of my invention is to provide a handle connection for quickly and conveniently securing and removing to and from the handle, the ends of a fish landing net frame.

A further object of the invention is to provide a handle connection so constructed, that a clamping action is had with the ends of a frame or loop, held within a sleeve, upon the longitudinal movement of a coupling element arranged within such sleeve.

A further object of the invention is to provide a detachable handle connection for use with various devices having frames or loops to be detachably secured to a handle.

A still further object of my invention is to provide a quick detachable handle connection, which is simple, positive in action, extremely strong and durable, and which will be inexpensive to manufacture.

Other objects and advantages of my invention will be apparent during the course of the following description.

In the accompanying drawings, forming a part of this application, and in which like numerals are employed to designate like parts throughout the same, Figure 1 is a plan view of a fish landing net including the detachable handle connection embodying my invention, Figure 2 is a fragmentary central longitudinal section through the same, drawn on an enlarged scale, Figure 3 is a vertical transverse section taken on line 3—3 of Figure 2, Figure 4 is a fragmentary central longitudinal section through a handle connection embodying a modified form of the invention, and, Figure 5 is a similar section showing a further modification of the invention.

In the drawings, where for the purpose of illustration, are shown preferred embodiments of my invention; attention being called first to Figures 1 to 3 inclusive, the numeral 10 designates a handle, which may be of any desired length and shape, and which may be made from any suitable material. Rigidly secured to the forward end of the handle, by any suitable means, is a metal cap or ferrule 11. This cap or ferrule 11 is preferably cylindrical, and is provided with a central opening 12, leading into a central longitudinal opening 13 in the handle 10. Rigidly held within the openings 12 and 13, by any suitable means, is a longitudinal coupling rod 15. The forward end of this coupling rod 15 extends beyond the forward end of the cap 11, and is screw threaded, as shown at 16.

The numeral 17 designates a preferably cylindrical coupling element, having a central longitudinal screw threaded opening 18, which extends through its rear end 18', and has its forward end terminating near the longitudinal center of the coupling element 17. The screw threaded opening 18 receives the forward screw threaded end 16 of the coupling rod 15. The coupling element 17 further comprises a solid forward end, provided with a pair of longitudinal side recesses 19, which converge rearwardly. These recesses extend through the forward end 20 of the element 17, and lead into the forward end of the screw threaded opening 18. The side recesses 19 are preferably circularly curved in transverse cross section, and they are diametrically oppositely arranged upon the coupling element 17. The arrangement of the side recesses 19 in the solid forward end of the coupling element 17 is such, that a rearwardly tapered web 21 is formed by them. It should be mentioned, that the coupling element 17 is not necessarily cylindrical, but can be made rectangular or hexagonal in transverse cross section, or in any other desired shape.

The numeral 22 designates an external cylindrical sleeve, having a preferably cylindrical central longitudinal opening 23, extending through the entire length of the sleeve 22. The central opening 23 slidably receives the coupling element 17. Formed in the sleeve 22, and arranged diametrically oppositely therein, is a pair of longitudinal rearwardly converging or inclined recesses or grooves 24, which are preferably circularly curved in transverse cross section. These recesses 24 extend through the inner surface of the sleeve 22, and through its forward end. The recesses terminate near the longitudinal center of the sleeve 22. The converging recesses 19 register in assembly with the companion converging recesses 24, and form with them diametrically oppositely arranged converging cylindrical sockets, for receiving the converging ends 25 of a fish landing net hoop or frame 26. When the handle connection is in the locked or gripping position, see Figure 2, the rear end 18' of the coupling sleeve 17 terminates short of the forward end of the cap 11.

In use, the handle 10 is turned, for turning the coupling rod 15 with relation to the coupling element 17 and the sleeve 22. This will feed the coupling element 17 forwardly with relation to the sleeve 22, and effect a relative lateral spreading of the recesses 19 with respect to the recesses 24. This will release the converging ends 25, which were clamped within these recesses. The frame 26 may now be readily separated from the sleeve 22, and associated elements. It is obvious that the converging ends 25 may again be inserted within the recesses 19 and 24, and clamped therein, by moving the coupling element 17 rearwardly longitudinally within the sleeve 22. This is effected by turning the coupling rod 15 in the proper direction. The converging ends 25 have a wedging action within the recesses holding them, and the rear end of the external sleeve 22 is clamped against the cap 11.

In Figure 4 of the drawings, I have shown a modification of the invention. In Figure 4, the numeral 27 designates a handle, rigidly secured to the forward end of which is a cap or ferrule 28. This cap 28 and the handle 27 have central longitudinal openings 29 and 30, for receiving and rigidly holding a coupling rod 31. The coupling rod 31 has a forward screw threaded end 32, which extends forwardly of the front end of the cap 28. The numeral 33 designates a preferably cylindrical coupling plug, which may be formed in other desired shapes in transverse cross section, and which has a longitudinal screw threaded opening 34 extending through its rear end, for receiving the screw threaded end 32. The coupling plug 33 is provided near its forward end with a pair of radially oppositely disposed recesses 35. The numeral 36 designates a preferably cylindrical external sleeve, having a central longitudinal opening 37, to slidably receive the coupling plug 33. The sleeve 36 is provided near its forward end with a pair of oppositely disposed radial openings 38, which register with the radial recesses 35 in assembly. The recesses 35 and the openings 38 are at right angles to the longitudinal axis of the sleeve 36. The numeral 39 designates the transverse extensions or ends of a loop or frame 40, of the device to which the handle is applied. When the handle is in the locked or gripping position, as shown in Figure 4, the inner or rear end 40' of the coupling plug 33 terminates short of the forward end of the cap 28.

In use, the handle 27 is turned until the screw threaded coupling rod 31 moves the coupling plug 33, so that the recesses 35 register exactly with the transverse openings 38. When the recesses 35 and the transverse openings 38 are in exact registration, the transverse ends 39 are inserted into the recesses 35. The handle 27 is now turned and tightened, and the coupling plug 33 is drawn rearwardly, relative to the external sleeve 36, and the transverse ends 35 are securely clamped in place. The rear end of the external sleeve 36 engages against the forward end of the cap 28. In order to detach the loop or frame 40 from the handle, it is merely necessary to turn the handle 27 slightly, to loosen the coupling plug 33.

In Figure 5, I have shown a further modification of the invention, in which the numeral 41 designates an external sleeve, corresponding to the sleeve 36. Adapted to slide axially within this sleeve 41, is a coupling plug 42, having a screw threaded opening 43, for receiving the screw threaded end of a coupling rod, corresponding to the rod 31. The coupling plug 42 has oppositely disposed and rearwardly converging recesses or sockets 44, which register with rearwardly converging openings 45 in the sleeve 41. The recesses 44 and openings 45 receive the rearwardly converging ends 46 of the frame of the device to which the handle is applied. In view of the foregoing description, in connection with the other forms of my invention, it is believed that the operation of the device illustrated in Figure 5 is obvious.

It is to be understood, that the forms of my invention herewith shown and described, are to be taken as preferred examples of the same, and that various changes in the shape, size, and arrangement of parts may be resorted to, without departing from the spirit of my invention, or the scope of the subjoined claim.

Having thus described my invention, what I claim is:

A detachable handle connection, comprising a handle, a rod permanently secured to the handle and rotatable therewith and having a forward screw threaded portion extending beyond the handle, a sleeve separate from the handle and detachably engaging the forward end of the handle to be separated therefrom, the sleeve having a bore of greater diameter than the diameter of the screw threaded portion for receiving the screw threaded portion of the rod and forming a space surrounding the screw threaded portion, the sleeve being provided at its forward end and upon its inner face with longitudinal recesses which converge toward the handle, a coupling element having substantially a sliding fit within the sleeve and arranged in the surrounding space and having its rear end spaced from the forward end of the handle and provided in its rear portion with a longitudinal screw threaded bore to receive the screw threaded portion of the rod, said coupling element including a solid forward portion provided in its sides with longitudinal recesses converging rearwardly toward the handle and extending through its forward end, the recesses of the solid portion being arranged opposite the recesses of the sleeve, and a frame having end portions which converge rearwardly toward the handle and are inserted within the opposed rearwardly converging recesses to be clamped in position when the coupling element is drawn rearwardly with relation to the sleeve.

HUBERT J. HERZOG.

REFERENCES CITED

The following references are of record in the file of this patent:

UNITED STATES PATENTS

| Number | Name | Date |
|---|---|---|
| 273,651 | Welles | Mar. 6, 1883 |
| 673,772 | Hall | May 7, 1901 |
| 734,946 | Prahar | July 28, 1903 |
| 924,124 | Worcester | June 8, 1909 |
| 1,044,278 | Smith | Nov. 12, 1912 |
| 1,245,917 | Hewitt | Nov. 6, 1917 |
| 1,482,452 | Williams | Feb. 5, 1924 |
| 1,524,826 | Icke | Feb. 3, 1925 |
| 1,940,875 | Neuwirth | Dec. 26, 1933 |
| 2,322,441 | Holliday | June 22, 1943 |

FOREIGN PATENTS

| Number | Country | Date |
|---|---|---|
| 447,725 | Great Britain | May 25, 1936 |